M. V. B. WALKER.
DEVICE FOR DETACHING HORSES.
No. 181,503. Patented Aug. 22, 1876.
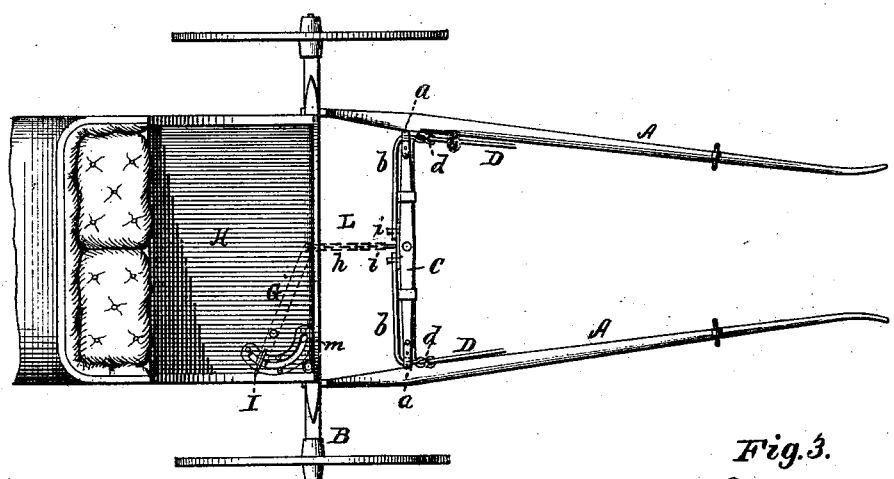
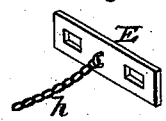
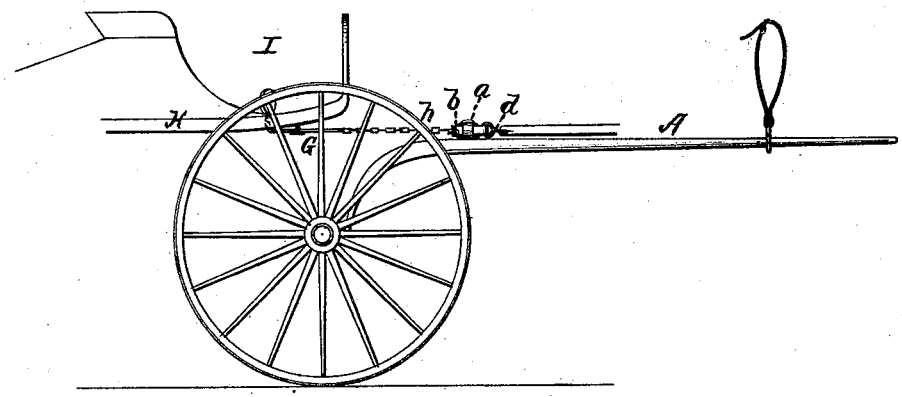
Attest: Inventor:

UNITED STATES PATENT OFFICE.

MARTIN V. B. WALKER, OF CORINTH, MISSISSIPPI.

IMPROVEMENT IN DEVICES FOR DETACHING HORSES.

Specification forming part of Letters Patent No. 181,503, dated August 22, 1876; application filed March 8, 1876.

*To all whom it may concern:*

Be it known that I, MARTIN V. B. WALKER, of Corinth, in the county of Alcorn and State of Mississippi, have invented certain new and useful Improvements in Apparatus for Detaching Horses from Vehicles; and I do hereby declare the following to be a full, clear, and exact description thereof, reference being had to the accompanying drawing, and to the letters of reference marked thereon.

The nature of my invention consists in the construction and arrangement of a device for detaching horses from vehicles, as will be hereinafter more fully set forth.

In order to enable others skilled in the art to which my invention appertains to make and use the same, I will now proceed to describe its construction and operation, referring to the annexed drawing, which forms a part of this specification, and in which—

Figure 1 is a plan view of a vehicle with my invention attached thereto. Fig. 2 is a side elevation of the same. Fig. 3 shows a detached part thereof.

A A represent the shafts connected to the front axle B of a vehicle by any suitable means. C is the whiffletree, pivoted to the cross-bar of the shafts A, and provided at each end with a loop, $a$, through which passes a strap, $b$. These straps have, at their front ends, hooks $d$ $d$, for the attachment of the traces D D, and the rear ends of said straps are passed along the rear side of the whiffletree, and fastened upon pins $i$ $i$ that project rearward from the whiffletree, one on each side of the center. Before the straps $b$ $b$ are placed on said pins a plate, E, is first placed on them. This plate has a central eye or staple, from which a chain, $h$, connects it with one end of a lever, G, pivoted under the bottom of the vehicle-body H. In the bottom of the body H is a curved slot, $m$, through which a foot-piece, I, is passed, and screwed or otherwise fastened in the end of the lever G.

When it becomes necessary to quickly detach the horses from the vehicle, the driver simply gives a quick push on the foot-piece I, turning the lever G on its pivot, which, by means of the chain $h$, pulls the plate E from the pins $i$ $i$. The plate E, in being pulled off from the pins, releases the straps $b$ $b$ from them, which straps are then drawn through the loops $a$ $a$, and the horse thus released from the vehicle.

Having thus fully described my invention, what I claim as new, and desire to secure by Letters Patent, is—

The combination of the whiffletree C, having end loops $a$ $a$, the trace-connecting straps $b$ $b$, pins $i$ $i$, plate E, with chain $h$, pivoted lever G, with foot-piece I, and the vehicle-body H, having curved slot $m$, all substantially as and for the purposes herein set forth.

MARTIN VAN BUREN WALKER.

Witnesses:
  W. P. CURLEE,
  A. L. BOONE.